(12) United States Patent
Redfern (10) Patent No.: US 7,539,255 B2
(45) Date of Patent: May 26, 2009

(54) USING MULTIPLE PILOT SIGNALS FOR TIMING ERROR ESTIMATION IN DIGITAL SUBSCRIBER LINE COMMUNICATIONS

(75) Inventor: Arthur J. Redfern, Plano, TX (US)

(73) Assignee: Texas Insturments Incorporated, Dallas, TX (US)

( * ) Notice: Subject to any disclaimer, the term of this patent is extended or adjusted under 35 U.S.C. 154(b) by 540 days.

(21) Appl. No.: 11/155,162

(22) Filed: Jun. 17, 2005

(65) Prior Publication Data

US 2005/0286649 A1 Dec. 29, 2005

Related U.S. Application Data

(60) Provisional application No. 60/582,739, filed on Jun. 23, 2004.

(51) Int. Cl.
*H04K 1/10* (2006.01)
(52) U.S. Cl. .................. 375/260; 370/203; 370/204; 370/208; 370/210; 370/340; 370/365; 375/326; 375/346; 375/347; 455/403; 455/423
(58) Field of Classification Search ................. 375/260
See application file for complete search history.

(56) References Cited

U.S. PATENT DOCUMENTS

| 7,039,004 B2 * | 5/2006 | Sun et al. ............... 370/208 |
| 7,139,320 B1 * | 11/2006 | Singh et al. ............ 375/260 |
| 7,257,165 B2 * | 8/2007 | Gardner .................. 375/260 |
| 2002/0176509 A1 | 11/2002 | Gatherer et al. |
| 2003/0026295 A1 | 2/2003 | Baum et al. |
| 2003/0026371 A1 | 2/2003 | Laroia et al. |
| 2003/0182612 A1 | 9/2003 | Tsuchie |
| 2004/0005022 A1 | 1/2004 | Zhu et al. |

FOREIGN PATENT DOCUMENTS

| EP | 0 903 897 A1 | 3/1999 |
| WO | WO 99/17511 | 4/1999 |

* cited by examiner

*Primary Examiner*—Shuwang Liu
*Assistant Examiner*—Dhaval Patel
(74) *Attorney, Agent, or Firm*—Steven A. Shaw; W. James Brady; Frederick J. Telecky, Jr.

(57) ABSTRACT

A receiving modem (20) including functionality for adjusting the synchronization of its timing relative to a transmitting modem (10), by recovering timing from a plurality of pilot tones transmitted by the transmitting modem (10) in a multicarrier modulation signal, is disclosed. For a subset of the pilot tones, the receiving modem (20) sums phase error differences, for example according to a weighted sum, to derive a phase error estimate relative to reference signals, in which noncoherent random noise cancels out, to correct for timing differences between the modems (10, 20). For another subset of the pilot tones not used in the phase error estimate, the receiving modem (20) analyzes the demodulated signal for those tones to adjust reference signals for each of those pilot tones. The adjusting is performed either by deriving an adjusted complex reference signal, or by adjusting coefficients in a frequency domain equalizer (28).

16 Claims, 5 Drawing Sheets

USING MULTIPLE PILOT SIGNALS FOR TIMING ERROR ESTIMATION IN DIGITAL SUBSCRIBER LINE COMMUNICATIONS

CROSS-REFERENCE TO RELATED APPLICATIONS

This application claims priority, under 35 U.S.C. §119(e), of Provisional Application No. 60/582,739, filed Jun. 23, 2004.

STATEMENT REGARDING FEDERALLY SPONSORED RESEARCH OR DEVELOPMENT

Not applicable.

BACKGROUND OF THE INVENTION

This invention is in the field of digital communications, and is more specifically directed to timing synchronization in such communications involving multiple frequency bands.

An important and now popular modulation standard for digital subscriber line (DSL) communications is Discrete Multitone (DMT) modulation. According to DMT technology, the available spectrum is subdivided into many subchannels (e.g., 256 subchannels of 4.3125 kHz). Each subchannel is centered about a carrier frequency that is phase and amplitude modulated, typically by Quadrature Amplitude Modulation (QAM), in which each symbol value is represented by a point in the complex plane; the number of available symbol values depends, of course, on the number of bits in each symbol. During initialization of a DMT communications session, the number of bits per symbol for each subchannel (i.e., the "bit loading") is determined according to the noise currently present in the transmission channel at each subchannel frequency and according to the transmit signal attenuation at that frequency. For example, relatively noise-free subchannels may communicate data in ten-bit to fifteen-bit symbols corresponding to a relatively dense QAM constellation (with short distances between points in the constellation), while noisy channels may be limited to only two or three bits per symbol (to allow a greater distance between adjacent points in the QAM constellation). Indeed, some subchannels may not be loaded with any bits, because of the noise and attenuation in those channels. In this way, DMT maximizes the data rate for each subchannel for a given noise condition, permitting high speed access to be carried out even over relatively noisy twisted-pair lines.

Figure 1:
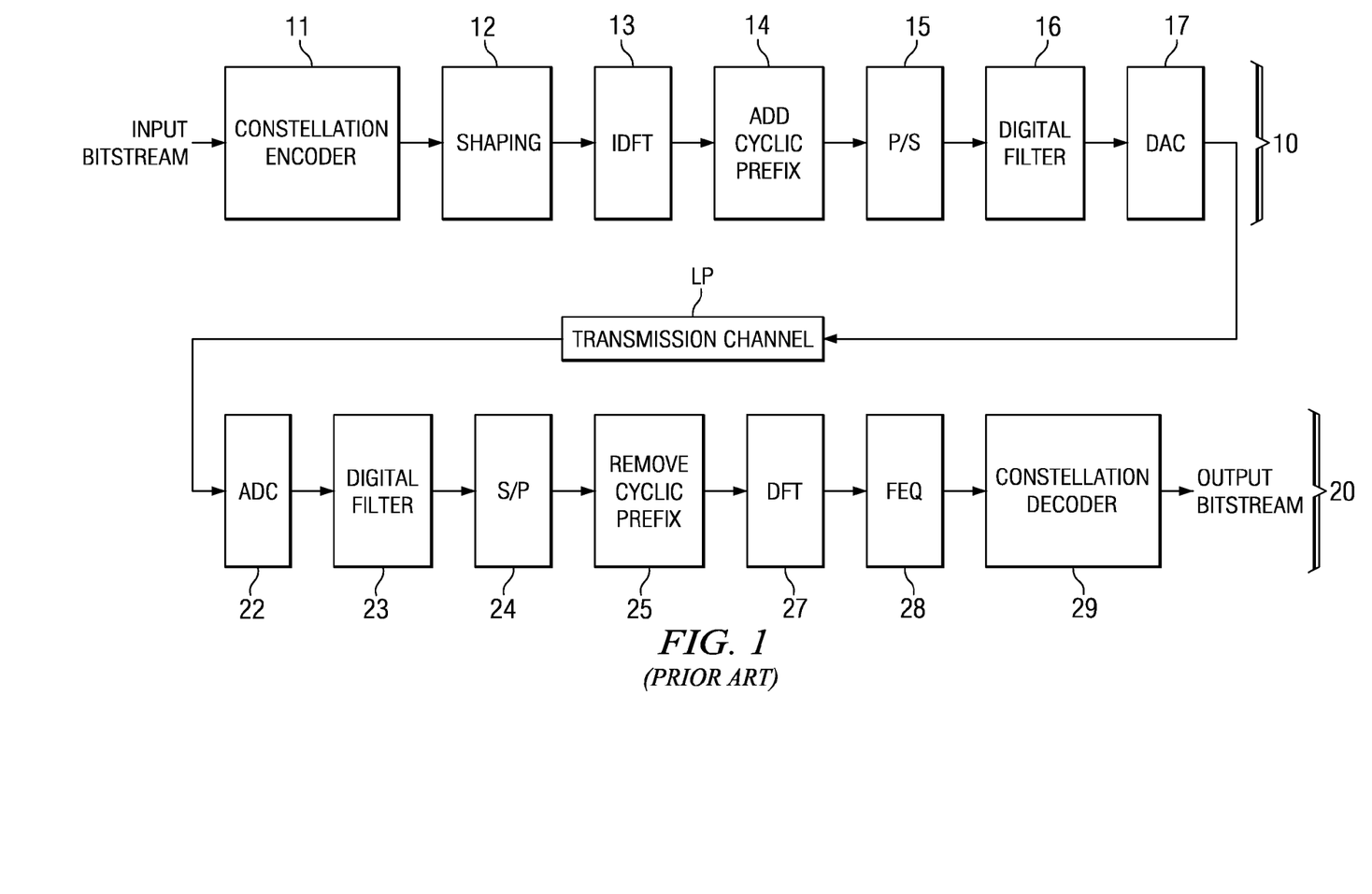
FIG. 1 is a data flow diagram, in block form, illustrating conventional DSL communications functions at the transmitter and receiver.

FIG. 1 illustrates the data flow in conventional DSL communications, for a given direction (e.g., downstream, from a central office "CO" to customer premises equipment "CPE"). Typically, each DSL transceiver (i.e., both at the CO and also in the CPE) includes both a transmitter and a receiver, so that data is also communicated in the opposite direction over transmission channel LP according to a similar DMT process. As shown in FIG. 1, the input bitstream that is to be transmitted, typically a serial stream of binary digits in the format as produced by the data source, is applied to constellation encoder 11 in a transmitting modem 10. Constellation encoder 11 fundamentally groups the bits in the input bitstream into multiple-bit symbols that are used to modulate the DMT subchannels, with the number of bits in each symbol determined according to the bit loading assigned to its corresponding subchannel, based on the characteristics of the transmission channel as mentioned above. Encoder 11 may also include other encoding functions, such as Reed-Solomon or other forward error correction coding, trellis coding, turbo or LDPC coding, and the like. The symbols generated by constellation encoder 11 correspond to points in the appropriate modulation constellation (e.g., QAM), with each symbol associated with one of the DMT subchannels. Following constellation encoder 11, shaping function 12 derives a clip prevention signal included in the encoded signals to be modulated, to reduce the peak-to-average ratio (PAR) as transmitted as described in copending application Ser. No. 10/034,951, filed Dec. 27, 2001, published on Nov. 28, 2002 as U.S. Patent Application Publication No. 2002/0176509, incorporated herein by this reference.

Referring back to FIG. 1, the encoded symbols are applied to inverse Discrete Fourier Transform (IDFT) function 13, which associates each symbol with one subchannel in the transmission frequency band, and generates a corresponding number of time domain symbol samples according to the Fourier transform. As known in the art, cyclic insertion function 14 appends a cyclic prefix or suffix (generically, affix), to the modulated time-domain samples from IDFT function 13, and presents the extended block of serial samples to parallel-to-serial converter 15. In ADSL2+ and VDSL, cyclic prefix and suffix insertion, and transmitter windowing, are combined into a single cyclic insertion function 14, which preferably operates on the modulated data in parallel form as shown; in ADSL, cyclic insertion function 14 preferably follows serial-to-parallel conversion, and simply prepends a selected number of sample values from the end of the block to the beginning of the block. Following conversion of the time-domain signal into a serial sequence by converter 15, and such upsampling (not shown) as appropriate, digital filter function 16 then processes the digital datastream in the conventional manner to remove image components and voice band or ISDN interference. The filtered digital datastream signal is then converted into the analog domain by digital-to-analog converter 17. After conventional analog filtering and amplification (not shown), the resulting DMT signal is transmitted over a channel LP, over some length of conventional twisted-pair wires, to a receiving DSL modem 20, which, in general, reverses the processes performed by the transmitting modem to recover the input bitstream as the transmitted communication.

At receiving DSL modem 20, analog-to-digital conversion 22 then converts the filtered analog signal into the digital domain, following which conventional digital filtering function 23 is applied to augment the function of pre-conversion receiver analog filters (not shown in FIG. 1). A time domain equalizer (TEQ) (also not shown in FIG. 1) may apply a finite impulse response (FIR) digital filter that effectively shortens the length of the impulse response of the transmission channel LP. Serial-to-parallel converter 24 converts the datastream into a number of samples (2N) for application to Discrete Fourier Transform (DFT) function 27, after removal of the cyclic extension from each received block in function 25. At DFT function 27, the modulating symbols at each of the subchannel frequencies are recovered by reversing the IDFT performed by function 12 in transmission. The output of DFT function 27 is a frequency domain representation of the transmitted symbols multiplied by the frequency-domain response of the effective transmission channel. Frequency-domain equalization (FEQ) function 28 divides out the frequency-domain response of the effective channel, recovering the modulating symbols. Constellation decoder function 29 then resequences the symbols into a serial bitstream, decoding any encoding that was applied in the transmission of the signal and producing an output bitstream that corresponds to the input bitstream upon which the transmission was based. This output bitstream is then forwarded to the client workstation, or to the central office network, as appropriate for the location.

In this example, the transmissions are described as taking place between a central office (CO) and the customer premises equipment (CPE). In many modern DSL installations, however, the CO communicate via twisted-pair lines over the entire distance to the subscriber, but rather transmits and receives along a high bandwidth communications facility, such as a fiber optic facility, to and from a remote location that is commonly referred to as an optical network unit (ONU). A well-known example of this arrangement is the Fiber-To-The-Curb (FTTC) infrastructure, in which ONUs are deployed in the customer neighborhoods. On one side, the ONUs communicate with the CO via the fiber optic facility, and on the other side, the ONUs communicate with CPE installations in its physical neighborhood by way of DMT modulated signals over twisted-pair wire, according to conventional DSL standards.

According to conventional DSL communications, one of the tones, or subchannels, in the downstream communications from CO (or ONU) to CPE is reserved as the "pilot" tone. This pilot tone carries a constant phase fixed frequency sinusoid, which is generated at the CO or ONU from a fixed reference, such as a fixed crystal oscillator. The CPE receives this pilot tone on the specified channel, and uses the pilot tone to adapt its timing to match that of the CO or ONU. Of course, timing synchronization is essential to accurate demodulation of the DMT signal, as will now be described relative to FIG. 2a.

Figure 2A:
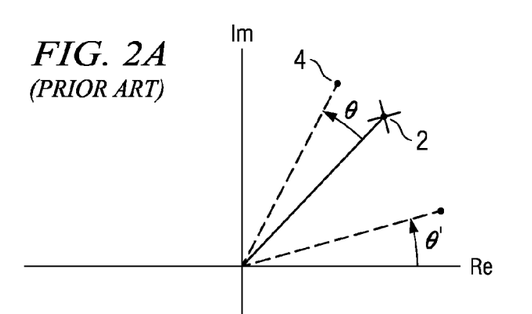
FIGS. 2a through 2c are complex plane plots of received and ideal pilot tone signals, illustrating the effects of timing phase error and channel variations.

In the exemplary plot of FIG. 2a in the complex plane, the true representation of an exemplary pilot tone signal is shown as point 2, at a phase angle of 45° on the unit amplitude circle. If the timing relationship between the transmitting and receiving modems 10, 20 (i.e., between the CO or ONU modem and the CPE modem) is perfectly synchronized, receiving modem 20 will sense the pilot signal at exactly this 45° phase angle. However, if receiving modem 20 has some timing error relative to transmitting modem 10, the demodulated pilot signal will exhibit a different phase angle than that of true point 2. In the example of FIG. 2a, point 4 illustrates an example of the location, in the complex plane, of the pilot signal as received by receiving modem 20 in which some timing error is present relative to the timing of the CO or ONU that transmitted the ideal 45° phase angle constant phase pilot signal. The phase error introduced by the timing mismatch between receiving modem 20 and transmitting modem 10 is shown in FIG. 2a as phase angle θ.

Figure 3:
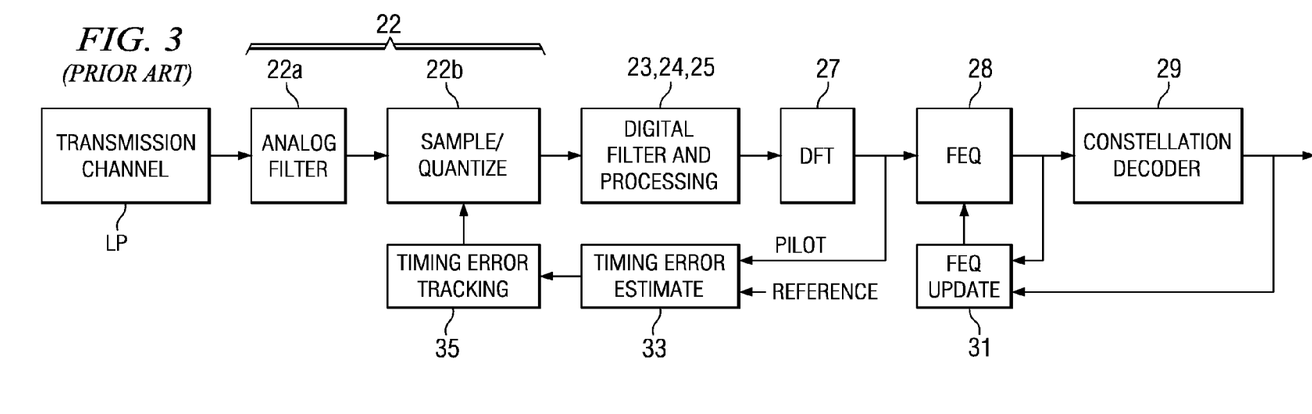
FIG. 3 is an data flow diagram, in block form, of timing correction functionality in a conventional receiving modem.

Typically, phase error θ is corrected at receiving modem 20 by adjusting the sample timing at its ADC 22. In effect, as shown in FIG. 2a, the phase error θ is rotated down to be a phase difference θ' relative to zero degrees, and the sample timing of ADC 22 is then adjusted accordingly. FIG. 3 illustrates a conventional data flow in receiving modem 20, including timing error adjustment of this type. In the arrangement of FIG. 3, ADC 22 is shown as including analog filter function 22a and sample/quantize function 22b, as it is sample/quantize function 22b that to which timing adjustment based on the pilot signal is applied.

In this conventional approach, timing error estimate function 33 receives the pilot signal after demodulation by DFT function 27, and compares this pilot signal with a reference signal, which is either a known reference signal or a decoded signal having a high degree of accuracy. Timing error estimate function 33 generates an estimate Θ of the phase difference between the received signal on the pilot subchannel X(k), and the reference signal $X_r(k)$ as:

$$\Theta = \tan^{-1}\left(\frac{\text{Im}(X(k)X_r^*(k))}{\text{Re}(X(k)X_r^*(k))}\right) \quad (1)$$

This timing error estimate Θ is applied to timing error tracking function 35, which combines the current error estimate with previous error estimates to form a current updated estimate of the timing error, and to adjust the timing of sample/quantize function 22b accordingly, in this example. Various conventional approaches in the correction process applied by error tracking function 35 are known, including changing the sampling frequency of sample/quantize function 22b, generating a numerical or signal input to control the sampling timing of sample/quantize function 22b, or adjusting a set of coefficients for an interpolation structure applied in ADC 22, and the like. Regardless of the specific control mechanism, the output of timing error tracking function 35 controls and adjusts the sampling applied by sample/quantize function 22b in ADC 22.

By way of example, a conventional second-order tracking algorithm applied by a conventional timing error tracking function 35 to a numerically controlled oscillator can be considered as:

$$\alpha = b\Theta + a\Theta_s \quad (2a)$$

where α is the value written to the numerically controlled oscillator, where learning factors a and b control the rate of the update, and where $\Theta_s$ is a sum, of phase error estimates Θ, that is updated with each new phase error estimate Θ as:

$$\Theta_s = \Theta + \Theta_s \quad (2b)$$

As such, the numerical value α is adjusted based on a sum of recent phase error estimates Θ, in effectively a second-order manner. Of course, the sum terms in sum $\Theta_s$ can also be temporally weighted to further adjust the adjustment.

It has been observed, according to this invention, that errors in the timing circuitry at receiving modem 20 relative to transmitting modem 10 appear as phase error θ relative to the ideal constant phase pilot signal, as illustrated in FIG. 2a. However, it has also been observed that phase error is also presented to the pilot signal (as well as other signals) by variations in the transmission channel LP itself. For example, time-dependent channel variations can be caused by temperature variations over the span of a day, or from day-to-day, resulting in changes in the propagation characteristics of the copper wire in the twisted-pair itself. These channel variations are reflected in phase rotation of the reference pilot signal $X_r(k)$, as illustrated in FIG. 2b.

Figure 2B:
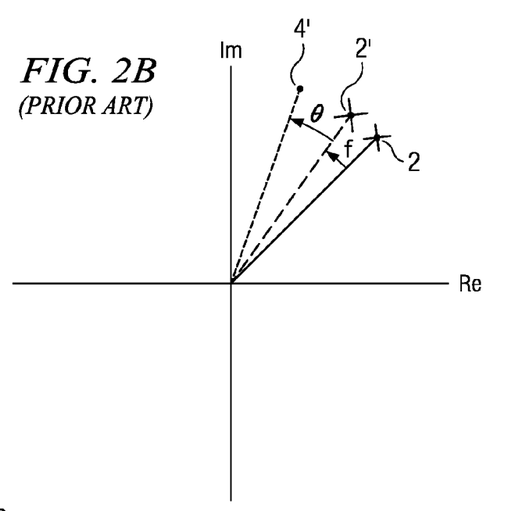

FIG. 2b shows true pilot signal point 2, which is again located on the unit circle at a constant 45° phase angle. Variations in temperature or other parameters regarding communications channel LP cause a phase error in the pilot signal as it is carried over the twisted-pair wire facility, in which case a phase-rotated pilot signal (i.e., assuming receiving modem 20 to be time synchronous with transmitting modem 10) is illustrated at null point 2' of FIG. 2b. This null point 2' corresponds to the reference pilot signal $X_r(k)$ of equation (1), as recovered from the received signal. Ideally, the reference pilot signal $X_r(k)$, or null point 2', would be at the true pilot signal point 2, but for the channel variations that caused phase rotation φ in this pilot signal during transmission. Timing error that is present at receiving modem 20 relative to transmitting modem 10 causes phase error θ as before, but because of the channel variations causing error in the reference signal, the total timing error thus the sum of phase rotation φ and phase error θ. Those skilled in the art will recognize that the phase rotation φ and phase error θ are not necessarily of the same polarity, as these two errors have independent causes relative to one another.

In the example described above relative to FIG. 3, the received pilot signal is extracted after demodulation by DFT function 27, but prior to FEQ 28. As such, the correction applied by timing error estimate function 33 and timing error tracking function 35 will cause the timing recovery function, and the corrections applied to ADC 22, to track both timing variations (phase error θ) and also channel variations (phase rotation φ).

However, as shown in FIG. 3, channel variations (phase rotation φ) may be addressed by updating the coefficients of FEQ function 28, based on a comparison of the decoded pilot signal to its ideal signal value, for example QAM point (+1, +1). In this regard, FEQ update function 31 has inputs receiving the output of FEQ function 28 itself and the output of constellation decoder 29. In its operation, FEQ update function 31 determines the error between the estimated constellation at the output of FEQ function 28 and the decoded constellation from constellation decoder 29, and updates the coefficients of FEQ function 28 accordingly. This adapting would, in theory, undo the time varying phase rotation caused by variations in the channel properties over time. However, if timing error were also based on the pilot signal as extracted after FEQ function 28, a "race" condition between the FEQ update of function 31 and the timing error tracking of function 35 could result, in which case either or both of the FEQ update and timing error tracking and correction functions could be unstable.

It is axiomatic that improvements in the accuracy of the phase error estimates can translate into better phase error tracking over time, and thus better timing performance. In this regard, it has been observed, according to this invention, that a higher frequency pilot channel would be preferred to facilitate observation of timing error effects, and that a pilot channel with a high signal-to-noise ratio (SNR) would be preferred for reduced corruption of the phase error estimate by noise.

As such, it has also been observed, according to this invention, that the signal-to-noise ratio of the timing error correction could be greatly improved through the use of multiple pilot signals, at different frequencies. Summation of the received pilot signals over the multiple channels would reinforce the coherent pilot signal, with the non-coherent random noise tending to cancel out, thus providing improved SNR for the detected pilot signal. This approach would be effective in detecting phase error due to timing variations at the receiving modem, relative to the transmitting modem. However, it has been further observed, in connection with this invention, that channel variations are typically frequency dependent, such that the phase rotation Φ due to channel variations will differ from channel to channel, and will vary over time.

Figure 2C:
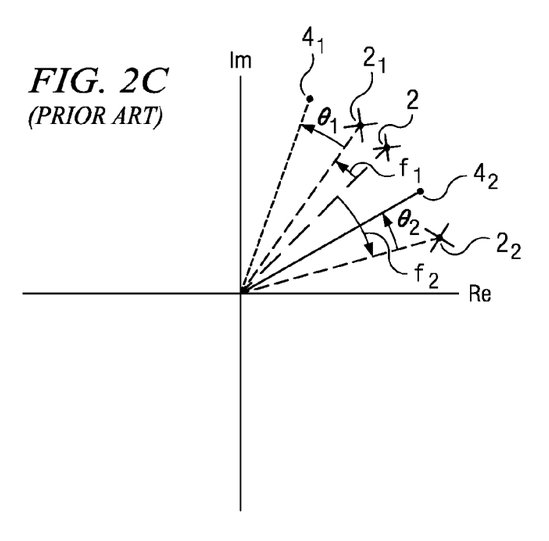

This effect is illustrated in FIG. 2c, by way of example. In this case, pilot signal point $2_1$ corresponds to the phase-rotated reference pilot signal for a first channel, which due to channel variations has a phase rotation $\phi_1$ of a positive polarity relative to the true QAM point 2. Because of timing errors at receiving modem 20, as before, received pilot signal point $4_1$ has a phase error $\theta_1$, also of positive polarity, relative to the phase-rotated reference pilot signal at point 21. The total phase error for this first subchannel is thus the sum of the phase rotation $\phi_1$ and the phase error $\theta_1$, as before. In this example, a pilot signal of the same ideal phase (i.e., also having a true QAM point 2) as the first subchannel is transmitted over a second subchannel. Channel variations on this second subchannel, such channel variations being frequency dependent as mentioned above, have resulted in a phase rotation $\phi_2$ that is of negative polarity and a different magnitude than the phase rotation $\phi_1$ on the first channel, as evidenced by phase-rotated reference pilot signal point $2_2$, relative to which this subchannel also has a phase error $\theta_2$. The magnitude of phase error $\theta_1$, $\theta_2$, will generally be different on these different subchannels, with higher error on higher frequency subchannels, while the polarity or direction of the phase error $\theta_1$, $\theta_2$ at receiving modem 20 is substantially independent of frequency. However, because of the different phase rotations $\phi_1$, $\phi_2$ on these subchannels, the total phase errors of the two pilot signals on the two subchannels are quite different from one another. Timing correction by summing weighted versions of these two pilot signals is necessarily inaccurate.

BRIEF SUMMARY OF THE INVENTION

It is therefore an object of this invention to provide a method and system for improving timing correction at a remote receiving modem relative to a transmitting modem.

It is a further object of this invention to provide such a method and system that attains this improvement by utilizing multiple pilot signals at multiple frequencies, while accounting for both frequency-dependent effects and also timing errors at the receiver.

It is a further object of this invention to provide such a method that corrects for phase rotation due to channel variations while not interrupting timing recovery.

It is a further object of this invention to provide such a method and system that can be readily applied into existing modem equipment.

Other objects and advantages of this invention will be apparent to those of ordinary skill in the art having reference to the following specification together with its drawings.

The present invention may be implemented into a receiving modem for digital multitone (DMT) modulation communications, in which a plurality of pilot signals are received over a communications facility, each received pilot tone being at one of a plurality of frequencies. A subset of the pilot tones is analyzed to correct for phase rotation due to channel variations, while the others of the plurality of pilot tones are summed to produce a timing correction for the receiving modem. Over time, each of the pilot tones is periodically analyzed to correct for phase rotation, resulting in improved timing correction for the modem and compensation for channel variation.

DETAILED DESCRIPTION OF THE INVENTION

The present invention will be described in connection with its preferred embodiment, namely as implemented into a receiving modem for digital subscriber line (DSL) communications, because it is contemplated that this invention will be particularly beneficial when implemented into such an application. However, it is also contemplated that this invention can be beneficially applied in other applications and environments, particularly those involving the communication of multichannel modulation (MCM) signals from which the receiver is to extract timing information, such alternatives including not only DSL communications over wired connections, but also orthogonal frequency division multiplexed (OFDM) wireless communications and the like. Accordingly, it is to be understood that the following description is provided by way of example only, and is not intended to limit the true scope of this invention as claimed.

Figure 4:
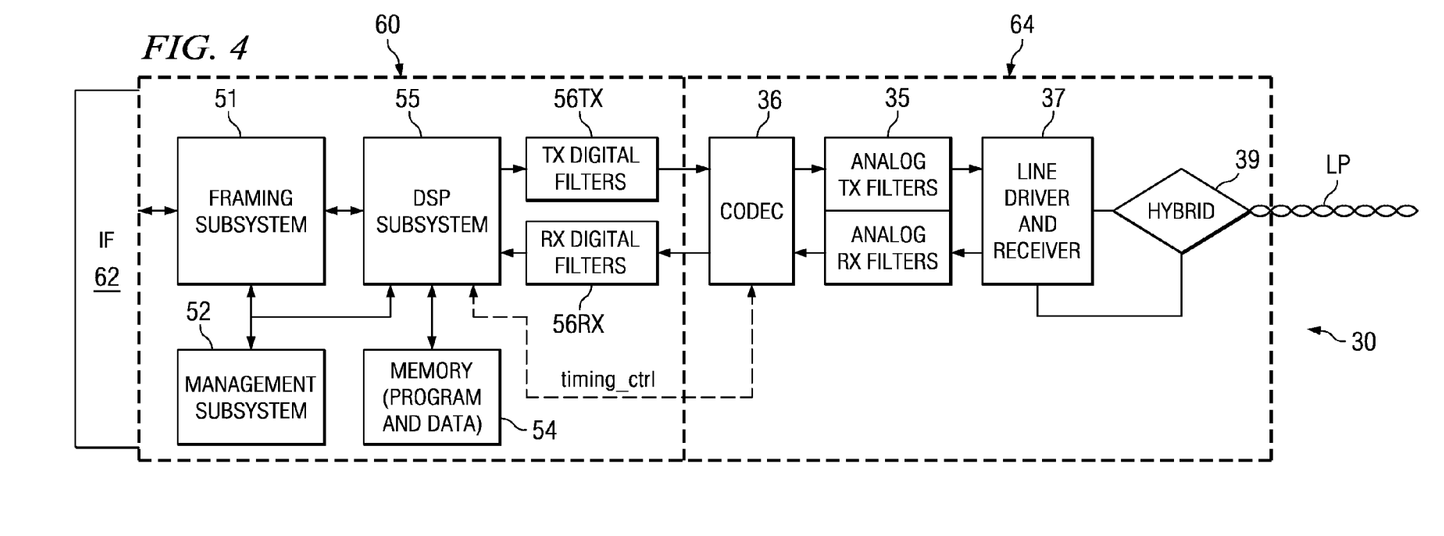
FIG. 4 is an electrical diagram, in block form, illustrating the construction of a transceiver according to the preferred embodiments of the invention.

Referring now to FIG. 4, the construction of an exemplary DSL modem 30 according to a preferred embodiment of the invention will be described. Because, in conventional DSL communications according to current standards, remote terminals such as customer premises equipment (CPE) modems typically are called upon to synchronize their timing to the timing of central office (CO) or optical network unit (ONU) DSL modems, it is contemplated that modem 30 of FIG. 4 is realized in such CPE equipment. Alternatively, of course, modem 30 may correspond to the construction of a modem in any such implementation in which timing recovery from transmitted signals, and timing error tracking and correction based on such recovery, is desired. Further, the construction of modem 30 shown in FIG. 4 is provided by way of example only, and is meant only to illustrate a possible modem architecture into which the preferred embodiment of the invention may be implemented. Of course, the invention may be implemented into DSL modems of different architectures, and into communications equipment of similar and different architectures for different communications applications (e.g., router equipment for OFDM wireless communications).

DSL modem 30 is effectively a transceiver, in the sense that it can both transmit and receive signals over communications loop LP. According to this preferred embodiment of the invention, DSL modem 30 includes digital transceiver 60, which is coupled to host interface 62 for communicating with a host computer, network switch fabric, network element such as a router, or the like, depending on the application. Digital transceiver 60 may support one communications port, such as shown in FIG. 4, or alternatively support multiple communications ports. In the example of FIG. 4, digital transceiver 60 is connected to a single instance of analog front end 64, which in turn couples to communications loop (or channel) LP, shown as twisted-pair wire in this example.

Analog front end 64 includes hybrid circuit 69, which is a conventional circuit that is connected to transmission loop LP, and that converts the two-wire arrangement of the twisted-pair facility to dedicated transmit and receive lines connected to line driver and receiver 67, considering that bidirectional signals are communicated over communications loop LP by DSL modem 30. Line driver and receiver 67 is a high-speed line driver and receiver for driving and receiving ADSL signals over twisted-pair lines. Line driver and receiver 67 is bidirectionally coupled to coder/decoder ("codec") circuit 66 via analog transmit and receive filters 65. Codec 66 in analog front end 64 performs the conventional analog codec operations on the signals being transmitted and received, respectively. These functions include digital and analog filtering, digital-to-analog conversion (transmit side), analog-to-digital conversion (receive side), attenuators, equalizers, and echo cancellation functionality, if desired. Examples of conventional devices suitable for use as analog front end 64 according to the preferred embodiment of the invention include conventional integrated analog front end devices, such as those available from Texas Instruments Incorporated.

As shown in FIG. 4, digital transceiver 60 includes framing subsystem 51, which is coupled to the host side of transceiver 60, and which formats digital data to be transmitted into frames, or blocks, for modulation and transmission. DSP subsystem 55 of digital transceiver 60 is preferably one or more digital signal processor (DSP) cores, having sufficient computational capacity and complexity to perform much of the digital processing in the encoding and modulation (and demodulation and decoding) of the signals communicated via digital transceiver 60. Transceiver 60 also includes memory resources 54, including both program and data memory, accessible by DSP subsystem 55 in carrying out its digital functions, for example according to software stored in memory resources 54. These digital functions includes the IDFT modulation (and DFT demodulation of received signals), appending (and removal) of cyclic extensions, among other conventional digital functions.

As shown in FIG. 4, digital transceiver 60 also includes transmit and receive digital filters 56TX, 56RX, respectively, for applying the appropriate filter functions to the transmitted and received signals, respectively. Digital filters 56TX, 56RX may be executed by DSP subsystem 40 according to the corresponding software routines, as known in the art, or alternatively may be realized as separate hardware resources as suggested by FIG. 4. Management subsystem 52 implements and effects various control functions within digital transceiver 60, communicating with each of the major functions of digital transceiver 30 to control its operation according to the desired number of ports to be supported.

As mentioned above, the architecture shown in FIG. 4 is presented by way of example only. Alternative architectures for DSL modem communication, and for other multicarrier modulation communication systems such as OFDM wireless communications, are also contemplated to be within the scope of the invention, and may be implemented by those skilled in the art having reference to this specification, without undue experimentation.

Figure 5:
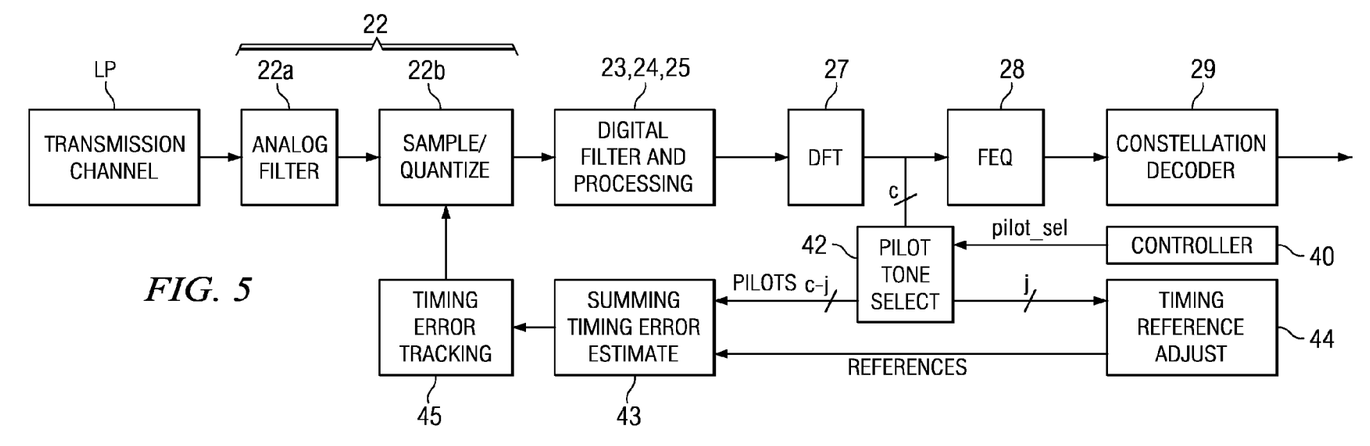
FIG. 5 is a data flow diagram, in block form, of timing correction functionality in on the receive side of the transceiver of FIG. 4, according to a first preferred embodiment of the invention.

Referring now to FIG. 5, a data flow architecture executable by digital transceiver 60 in modem 30 of FIG. 4, for performing timing error estimation, tracking, and correction according to the preferred embodiment of the invention, will now be described. The elements of FIG. 5 that correspond to those described above relative to the conventional data flow diagram of FIG. 3 are referred to by the same reference numerals, for the sake of clarity. By way of summary, the data path of the receive side of modem 30, as illustrated in FIG. 5, includes analog-to-digital converter (ADC) 22, which is coupled to transmission loop or channel LP to receive signals therefrom, and includes analog filter function 22a and sample/quantize function 22b. ADC 22 is preferably realized, in hardware, within analog front end 64 of FIG. 4, for example. The converted digital representation of the received filtered analog signal, at all of the subchannel frequencies, is then applied to digital filter and processing block 23, 24, 25, which applies conventional digital filtering to augment analog filter function 22a, (not shown) and preferably a time domain equalizer (TEQ) in the form of a finite impulse response (FIR) digital filter to effectively shortens the length of the impulse response of the transmission channel LP. Digital filter and processing block 23, 24, 25 also performs serial-to-parallel conversion of the datastream into a block of samples for demodulation Discrete Fourier Transform (DFT) function 27, and removes any cyclic extension or affix from each received block. DFT function 27 demodulates the DMT modulated symbols at each subchannel frequency, effectively reversing the IDFT that modulated the signal prior to transmission. As before, DFT function 27 presents a frequency domain representation of the transmitted symbols multiplied by the frequency-domain response of the effective transmission channel, and applies this representation to frequency-domain equalization (FEQ) function 28, which in turn recovers the modulating signals by dividing out the frequency-domain response of the effective channel. Constellation decoder function 29 resequences the symbols into a serial bitstream, decoding the encoding applied prior to transmission, and forwards an output bitstream to a client workstation or other destination. It is contemplated that all of the digital domain operations, including digital filter and processing function 23, 24, 25, DFT function 27, FEQ 28, and decoder 29 may be performed by digital transceiver 60 in modem 30, by way of receive digital filters 56RX, DSP subsystem 55, and framing subsystem 51, as described above.

According to the preferred embodiment of the invention, digital transceiver 60 of modem 30 also includes digital functionality for estimating, tracking, and correcting timing error in modem 30 and channel variations in channel LP, according to the preferred embodiments of the invention as will be described below. Each of the functions described in connection with this digital functionality may be realized by software instructions executed by DSP subsystem 55 of modem 30, or by a co-processor resource such as management subsystem 52, either or both under the control of program instructions stored and retrieved from memory 54. Alternatively, separate programmable or custom logic may be provided in digital transceiver 60, or in modem 30 apart from transceiver 60, to provide these functions.

As shown in FIG. 5, the output of DFT function 27 presents a frequency domain representation of the demodulated received signals, for example in the form of real and imaginary component values of a QAM constellation point for each of the subchannels used in transmission. According to the preferred embodiments of the invention, multiple ones (numbering c in this example) of the subchannels are carrying a pilot signal from the transmitter, each pilot signal preferably in the form of a constant phase sinusoidal signal at the subchannel frequency. The pilot signals at these c subchannel frequencies are effectively applied to pilot tone select function 42, which is controlled by controller 40. Controller 40 may be realized by way of a software program executed within transceiver 60, for example by DSP subsystem 55, or alternatively by way of custom logic, as described above. In response to a selection signal on lines pilot_sel from controller 40, pilot tone select function 42 selects a subset of j of the full set of c pilot tones for application to timing reference adjust function 44, and forwards the remaining c-j pilot tones to summing timing error estimate function 43 as shown in FIG. 5.

According to the preferred embodiment of the invention, timing reference adjust function 44 processes the subset of j pilot tones used to adjust the timing reference for those tones to eliminate phase rotation $\phi$ caused by channel variations, during which time those j pilot tones are not involved in the timing error estimate. Conversely, summing timing error estimate function 43 produces the next timing error estimate based on the remaining c-j pilot tones, based on the assumption that the reference signals for those tones is still reasonably accurate (i.e., phase rotation $\phi$ for those tones has been recently adjusted out). Accordingly, in effectively a time-multiplexed manner, each of the c pilot tones is periodically removed from the timing recovery (phase error) analysis for adjustment of its timing reference to remove channel variation dependent phase rotation effects. Optionally, a selected one of the pilot tones could always be included in the subset of c-j pilot tones that are used for timing recovery, without its timing reference being updated, in which case each of the other c-1 pilot tones would be periodically removed from timing recovery for update of its timing reference as described above. Considering the typical operation of DFT function 27 as it demodulates the received signal in effectively a block-by-block manner, the j pilot tones may be periodically selected on a block-by-block basis. As will be described below, it is contemplated that both of the processes of producing a timing error estimate and adjusting the timing reference, will typically require several blocks, or frames, in each instance.

It is contemplated that the physical causes of channel variations are relatively slow moving effects. For example, as noted above, changes in temperature in the twisted-pair wire facility or its binder along the length of transmission loop LP are relatively slow changes as compared to the time required to demodulate one or a few blocks at DFT function 27. As such, there may be many blocks during which no pilot tone need b forwarded by pilot tone select 42 to timing reference adjust function 44; conversely, it is contemplated that the entire set of pilot tones may each be processed by timing reference adjust function 44, one at a time, over a relatively long span of time, such as a few seconds.

Referring back to FIG. 5, the remaining c-j pilot tones, which are not selected by controller 40 for forwarding to timing reference adjust function 44, are instead forwarded to summing timing error estimate function 43. As will be described in further detail below, these c-j pilot tones are each compared against their corresponding reference signal (generated by timing reference adjust function 44 based on a previous adjustment process for each tone), and a weighted sum of the resulting phase errors among these c-j pilot tones is used to produce a current phase error estimate $\Theta$ corresponding to timing differences between modem 30 and the transmitter of the pilot tones. This phase error estimate $\Theta$ is forwarded to timing error tracking function 45, by way of which the appropriate correction signal is generated (based on the current phase error estimate $\Theta$ and previous phase error estimates) and applied to sample-quantize function 22b in ADC 22 (e.g., on line timing_ctrl of FIG. 4).

Figure 6:
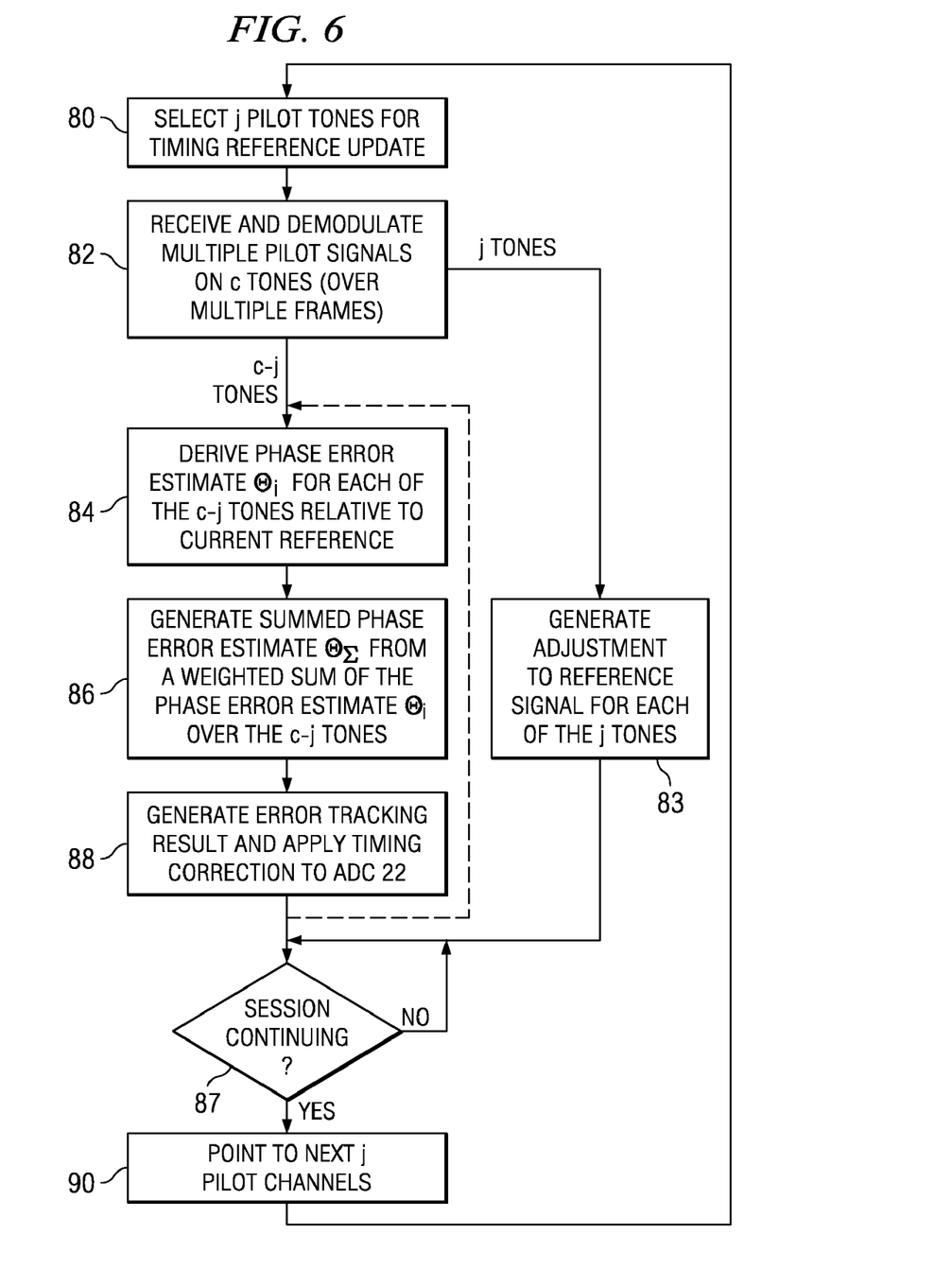
FIG. 6 is a flow diagram of the operation of the transceivers in effecting timing correction, according to the preferred embodiments of the invention.

FIG. 6 is a flow diagram illustrating the operation of modem 30 according to this preferred embodiment of the invention, as will now be described relative to it in combination with FIG. 5. Again, it is contemplated that timing recovery and correction functions 40, 42, 43, 44 of FIG. 5 may be realized by way of custom or programmable logic, DSP subsystem 55 of FIG. 4 executing a sequence of program instructions, or any appropriate realization of circuitry for performing these functions as will be apparent to those skilled in the art having reference to this specification. As such, each of these functions may correspond to a specific hardware circuit, a specific software routine, or some combination of the two, depending on the particular implementation.

It is presumed that, for purposes of this invention, a transmitting modem is transmitting, to modem 30 over communications channel LP, a DMT signal that includes constant phase pilot signals on multiple subchannel frequencies. It is also presumed that the initialization and establishment of a DSL communications session between modem 30 and the transmitting modem has already been established; alternatively, it is also contemplated that the operations of modem 30 shown in FIG. 6 and described here may be readily adapted to also be used in connection with initialization of a DSL communications session. In any case, the multiple pilot tones are preferably spread over the entire bandwidth, so that both low frequency and high frequency pilot signals are received. It is contemplated that as few as two pilot signals may be so transmitted, so long as some substantial number of frames are processed by modem 30 in which both pilot tones are applied to timing recovery, so as to take advantage of the summing effects on the SNR of the pilot signals. Preferably, three or more pilot tones are used, so that at least two pilot signals are being additively combined at any given frame during operation. It is also contemplated that these pilot signals need not be coherent in phase relative to one another, and that these pilot signals may be transmitted using QAM constellations as simple as 4-QAM or more complex if desired.

In process 80, controller 40 selects the subset of j pilot tones from the full set of c tones that are to be analyzed for updating of their respective timing reference signals. As mentioned above, these j pilot tones may number as few as zero, but typically is contemplated to include at least one pilot tone. The selection made in process 80 may be a periodic cycling-through of each of the c pilot tones so that each has its timing reference periodically adjusted, or may be a random selection (accomplishing the same end over time), or alternatively may be an "educated" selection so that only "valid" pilot tones, as measured during initialization or periodic channel maintenance, are used in the timing reference update procedure. In any case, the other c-j pilot tones will be used in timing recovery, as will be described. In process 82, modem 30 receives and demodulates these multiple pilot signals (along with the data and control information being simultaneously communicated on the other tones or subchannels in the DMT spectrum), in the conventional manner. As mentioned above, because both timing recovery and reference signal update are preferably performed over multiple frames, it is contemplated that demodulation process 82 will be performed over those multiple frames. The remaining functions in the flow diagram of FIG. 6 may be performed incrementally as each frame is demodulated, or alternatively as a batch process after all of the multiple frames are demodulated, depending on the specific implementation.

In process 84, summing timing error estimate function 43 compares each of the remaining subset of c-j pilot tones that are not selected in process 80 for update of the timing reference to their respective reference signals $X_r(k)$, to derive a summed phase error estimate $\Theta_\Sigma$. Process 84 may be performed in substantially the conventional manner for determining the phase error estimate $\Theta$ for a single pilot signal, as described above relative to FIGS. 1, 2a and 2b except that, because multiple pilot tones are processed by process 84, multiple phase error estimates $\Theta_{Pk}$ are produced, one for each of the c-j pilot tones not selected in process 80 (Pk being the pilot tone index). As mentioned above, for the sake of accuracy, these multiple phase error estimates $\Theta_{Pk}$ are preferably generated for each demodulated frame, with phase error tracking function applying a second order or other filtering operation to the individual frame-based phase error estimates $\Theta$. In process 86, timing error estimate function 43 then produces a summed phase error estimate $\Theta_\Sigma$ as a weighted sum of the multiple phase error estimates $\Theta_{Pk}$ produced in process 84, as follows:

$$\Theta_\Sigma = g_{P1}\Theta_{P1} + g_{P2}\Theta_{P2} + \ldots + g_{PT}\Theta_{PT} \quad (3)$$

summed over those c-j pilot tones not selected in process 80, and where $g_{Pk}$ is a weighting factor applied to each of these pilot tones. For example, it is contemplated that higher frequency pilot tones may provide better accuracy in phase error measurement, and as such it may be useful to more heavily weight high frequency pilot tones in the weighed sum of process 86; in addition, or alternatively, the SNR of the various pilot tone subchannels measured during initialization may be used to set the weighting factors $g_{Pk}$, so that better-performing channels may more heavily weight the summed phase error estimate $\Theta_\Sigma$. This summed phase error estimate $\Theta_s$ is forwarded to timing error tracking function 45.

In process 88, timing error tracking function 45 applies the desired temporal weighting to the summed phase error estimate $\Theta_\Sigma$ from process 86 to produce the appropriate timing recovery adjustment signal to ADC 22. While the tracking algorithm applied by timing error tracking function 45 may follow a conventional algorithm, the accuracy of this adjustment is contemplated to be much more accurate than in conventional modems, because the summing of the multiple pilot signal phase errors in process 86 will have a higher SNR than a single pilot signal phase measurement, because of the reinforcing of the coherent addition of the pilot signal among the multiple pilot tones versus the noncoherent addition of random noise over those tones. As mentioned above relative to equations (2a) and (2b), an example of a conventional second-order tracking algorithm suitable for use by timing error tracking function 45 in effecting process 88, in the case in which ADC 22 utilizes a numerically controlled oscillator, could generate the oscillator control value as the sum of the most recent summed phase error estimate $\Theta_\Sigma$ with a sum of phase error estimates from previous updates, with learning factors applied to the sum terms, and in which the sum of the previous phase error estimates is updated with each adjustment (perhaps in a weighted manner).

Meanwhile, for each of the j pilot tones selected in process 80, timing reference adjust function 44 receives the various demodulated symbols, and produces an adjustment to the reference signal for each of those j pilot tones, in process 83. By way of example, one preferred approach to generating an updated reference signal $X_r(k)$ for the kth pilot tone is a simple arithmetic average of the received pilot symbol on that tone over N symbols, such as:

$$X_r(k) = \frac{1}{N} \sum_{n=0}^{N-1} X(k, n) \quad (4)$$

where the kth pilot tone is in the set of j pilot tones selected in process 80, of course, and where N is the number of received pilot tone symbols that are to be averaged together. As evident from this notation, the updated reference signal $X_r(k)$ is preferably a complex value, and as such implicitly includes phase information that includes an estimate of the phase rotation φ for that tone; averaging of the demodulated pilot tone phase over multiple frames is contemplated to provide a good estimate of the pilot tone, as rotated by factors such as channel variations. Alternatively, other approaches to generating an updated reference signal $X_r(k)$ include least-mean-squared averaging or some variation thereof.

Following process 83 for each of the j pilot tones, timing reference adjust function 44 then retains updated reference signals for these j subchannels, for later use when these j pilot tones are no longer selected in process 80, but are instead to be used in timing recovery via processes 84, 85, 86.

Following ongoing timing recovery for the c-j pilot tones that were not selected in process 80, and timing reference updating for the j pilot tones that were, decision 87 is next performed to determine whether transmissions are continuing. If so, modem 30 executes process 90 to identify the next subset of j pilot channels that are to be selected in a next instance of process 80, following which process 80 is executed for that selected subset. As mentioned above, the particular tones identified in process 90 may be selected in a periodic sequence, or randomly, or according to parameters measured during initialization. The timing recovery and reference timing adjustment process is then repeated for this next selected subset. And, as also mentioned above, it is contemplated that the subset of j pilot tones may be empty, so that all c pilot tones are used for timing recovery, especially in installations in which channel variations are expected to occur slowly.

According to an alternative embodiment of the invention, as will now be described in detail relative to FIG. 7, modem 30 effects its reference timing adjustment at a point downstream from the sampling and DFT functions, by adjusting the coefficients of FEQ function 28. This alternative approach generally follows the operation described above relative to FIG. 6, in which the timing recovery processes 84, 85, 86 are executed on the c-j pilot tones that are not selected in process 80, except that in this case the c-j pilot tones are taken after frequency domain equalization by FEQ function 28, as will be described below. However, more significantly, modem 30 is architected in a different manner for purposes of reference timing update, and thus for performing process 83 in a different way. And those skilled in the art having reference to this specification will readily recognize that this architecture will preferably be realized by way of purely digital operations executed by DSP subsystem 55 (FIG. 4) or other programmable logic.

Figure 7:
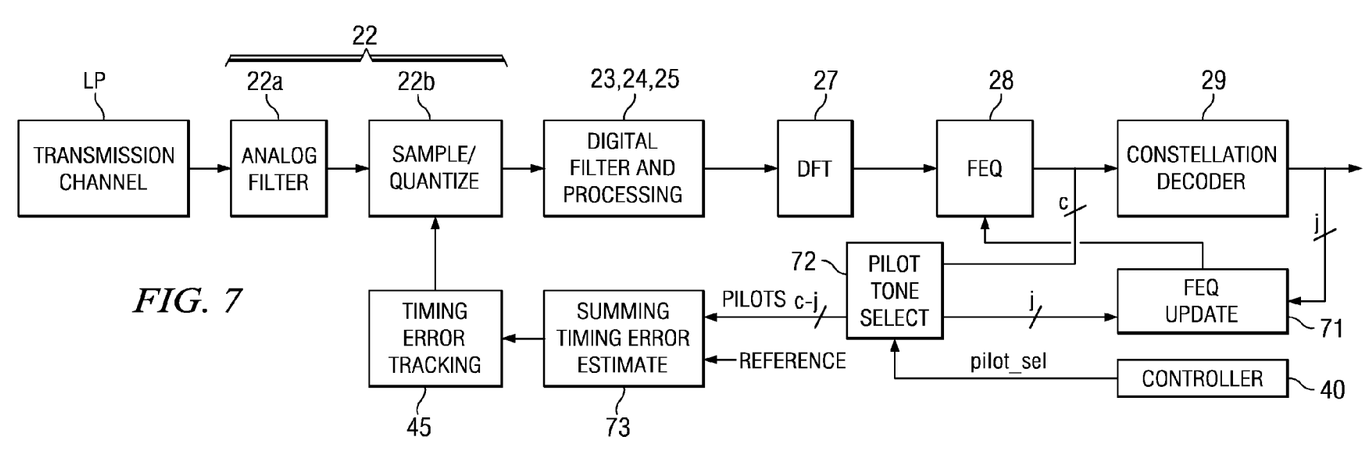
FIG. 7 is a data flow diagram, in block form, of timing correction functionality in on the receive side of the transceiver of FIG. 4, according to a second preferred embodiment of the invention.

As shown in FIG. 7, modem 30 includes FEQ update function 71, which receives, from pilot tone select function 42, the output of FEQ function 28 for the subset of j pilot tones selected by pilot tone selection function 72 in process 80, As before, the j pilot tones forwarded to FEQ update function 71 are excluded from timing recovery, while pilot tone select function 72 forwards the output of FEQ function 28 for the remaining c-j pilot tones to summing timing error estimate function 73 for execution of processes 84, 85, 86. In addition, according to this alternative embodiment of the invention, the output of decoder 29 for each of these j pilot tones is also forwarded to FEQ update function 71. FEQ update function 71 executes timing reference update function 83 of FIG. 6 by altering the FEQ coefficients for those j pilot tones, thus accounting for the phase rotation $\phi$ caused by channel variations on those frequencies. In other words, FEQ update function 71 receives the decoded QAM points for each of the j pilot tones, compares the output of FEQ function 28 for those tones with the corresponding decoded QAM points, and applies a correction to FEQ function 28 in the conventional manner, adjusting the coefficients applied by FEQ function 29 to "move" the pilot tone signal for those tones closer to the true constellation point so as to better match the encoded value. It is contemplated that those skilled in the art having reference to this specification will be readily able to implement this FEQ update function 71 and process 83.

In either case, this invention enables the use of multiple pilot channels to attain an improved signal-to-noise ratio in the performing of timing recovery in a digital multitone receiver, such as a DSL modem deployed at customer premises equipment (CPE). This improved timing recovery and correction for timing errors at the receiver are attained, according to this invention, while also achieving the ability to correct for frequency-dependent channel variations, which typically result in a phase rotation of the transmitted pilot signals, rather than timing errors at the receiver. As a result, efficient and improved timing recovery can be provided, with little or no increased complexity at the receiver.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of synchronizing timing at a receiver of multichannel modulation signals over a transmission facility, relative to a transmitter, comprising the steps of:
    receiving a multichannel modulation signal comprised of a plurality of pilot tones, each pilot tone at one of a plurality of subchannel frequencies of the multichannel modulation signal;
    converting the multichannel modulation signal into a digital signal;
    demodulating the digital signal including the received plurality of pilot tones over at least one frame;
    selecting a first subset of the plurality of pilot tones;
    for a second subset of the plurality of pilot tones, the second subset not including any of the plurality of pilot tones in the first subset, deriving a summed phase error estimate based on a phase error estimate of each of the demodulated plurality of pilot tones in the second subset relative to a reference signal, the step of deriving a summed phase error estimate comprising;
        comparing each of the second subset of the plurality of pilot tones with the reference signal to determine a phase error estimate for that pilot tone; and
        summing the phase error estimates of each of the second subset of the plurality of pilot tones to produce the summed phase error estimate, the summing step comprises:
            weighting the phase error estimates for each of the second subset of the plurality of pilot tones; then
            summing the weighted phase error estimates;
    controlling the converting of subsequent frames responsive to the summed phase error estimate; and
    for each of the first subset of the plurality of pilot tones, adjusting an associated reference signal.

2. The method of claim 1, further comprising:
    selecting a different one or more of the plurality of pilot tones for the first subset of the plurality of pilot tones; and
    then repeating the converting, demodulating, deriving, controlling, and adjusting steps.

3. The method of claim 2, wherein the second subset includes all of the plurality of pilot tones that are not included in the first subset.

4. The method of claim 1, wherein the controlling step comprises:
applying the summed phase error estimate to a timing error tracking function.

5. The method of claim 1, further comprising:
applying a frequency domain equalizer to the demodulated digital signal;
wherein the step of adjusting an associated reference signal comprises:
for each of the first subset of the plurality of pilot tones, adjusting the frequency domain equalizer in response to the demodulated digital signal for that pilot tone.

6. A method of synchronizing timing at a receiver of multichannel modulation signals over a transmission facility, relative to a transmitter, comprising the steps of:
receiving a multichannel modulation signal comprised of a plurality of pilot tones, each pilot tone at one of a plurality of subchannel frequencies of the multichannel modulation signal;
converting the multichannel modulation signal into a digital signal;
demodulating the digital signal including the received plurality of pilot tones over at least one frame;
selecting a first subset of the plurality of pilot tones;
for a second subset of the plurality of pilot tones, the second subset not including any of the plurality of pilot tones in the first subset, deriving a summed phase error estimate based on a phase error estimate of each of the demodulated plurality of pilot tones in the second subset relative to a reference signal;
controlling the converting of subsequent frames responsive to the summed phase error estimate comprising applying the summed phase error estimate to a timing error tracking function;
for each of the first subset of the plurality of pilot tones, adjusting an associated reference signal;
selecting a different one or more of the plurality of pilot tones for the first subset of the plurality of pilot tones;
then repeating the converting, demodulating, deriving, controlling, and adjusting steps; and wherein the step of applying the summed phase error estimate comprises:
weighting the summed phase error estimate with a first learning factor; and
summing the weighted summed phase error estimate with a weighted sum of previous summed phase error estimates.

7. A method of synchronizing timing at a receiver of multichannel modulation signals over a transmission facility, relative to a transmitter, comprising the steps of:
receiving a multichannel modulation signal comprised of a plurality of pilot tones, each pilot tone at one of a plurality of subchannel frequencies of the multichannel modulation signal;
converting the multichannel modulation signal into a digital signal;
demodulating the digital signal including the received plurality of pilot tones over at least one frame;
selecting a first subset of the plurality of pilot tones;
for a second subset of the plurality of pilot tones, the second subset not including any of the plurality of pilot tones in the first subset, deriving a summed phase error estimate based on a phase error estimate of each of the demodulated plurality of pilot tones in the second subset relative to a reference signal;
controlling the converting of subsequent frames responsive to the summed phase error estimate; and
for each of the first subset of the plurality of pilot tones, averaging the demodulated pilot tone over a plurality of frames to produce an adjusted reference signal for that pilot tone.

8. A receiver apparatus for multicarrier modulation communications, comprising:
analog front end circuitry, comprising driver circuitry, for coupling to a communications facility;
an interface for coupling to a host system; and
circuitry, coupled to the analog front end circuitry and the interface, for processing a multichannel modulation signal received over the communications facility, the multichannel modulation signal comprised of a plurality of pilot tones, each pilot tone at one of a plurality of subchannel frequencies of the multichannel modulation signal, according to a sequence of operations comprising:
converting the multichannel modulation signal into a digital signal;
demodulating the digital signal including the received plurality of pilot tones over at least one frame;
selecting a first subset of the plurality of pilot tones;
for a second subset of the plurality of pilot tones, the second subset not including any of the plurality of pilot tones in the first subset, deriving a summed phase error estimate based on a phase error estimate of each of the demodulated plurality of pilot tones in the second subset relative to a reference signal;
controlling the converting of subsequent frames responsive to the summed phase error estimate; and
for each of the first subset of the plurality of pilot tones, averaging the demodulated pilot tone over a plurality of frames to produce an adjusted reference signal for that pilot tone.

9. The apparatus of claim 8, wherein the circuitry comprises:
an analog-to-digital converter, for receiving the multichannel modulation signal in analog form and converting it into the digital signal; and
a digital transceiver for applying the demodulating, selecting, deriving, and adjusting operations to the converted digital signal.

10. The apparatus of claim 9, wherein the digital transceiver comprises programmable circuitry;
and wherein the digital transceiver performs the demodulating, selecting, deriving, controlling, and adjusting operations by executing program instructions.

11. The apparatus of claim 10, further comprising:
a memory for storing the program instructions.

12. The apparatus of claim 9, wherein the controlling operation comprises:
adjusting a sample time of the analog-to-digital converter.

13. The apparatus of claim 8, wherein the sequence of operations further comprises:
selecting a different one or more of the plurality of pilot tones for the first subset of the plurality of pilot tones; and
then repeating the converting, demodulating, deriving, controlling, and adjusting steps.

14. The apparatus of claim 8, wherein the operation of deriving a summed phase error estimate comprises:
comparing each of the second subset of the plurality of pilot tones with the reference signal to determine a phase error estimate for that pilot tone; and summing the phase error estimates of each of the second subset of the plurality of pilot tones to produce the summed phase error estimate;

and wherein the controlling operation comprises:

applying the summed phase error estimate to a timing error tracking function; and adjusting a sample time of an analog-to-digital converter responsive to a result of the timing error tracking function.

15. A receiver apparatus for multicarrier modulation communications, comprising:

analog front end circuitry, comprising driver circuitry, for coupling to a communications facility;

an interface for coupling to a host system; and circuitry, coupled to the analog front end circuitry and the interface, for processing a multichannel modulation signal received over the communications facility, the multichannel modulation signal comprised of a plurality of pilot tones, each pilot tone at one of a plurality of sub-channel frequencies of the multichannel modulation signal, according to a sequence of operations comprising:

converting the multichannel modulation signal into a digital signal;

demodulating the digital signal including the received plurality of pilot tones over at least one frame;

selecting a first subset of the plurality of pilot tones;

for a second subset of the plurality of pilot tones, the second subset not including any of the plurality of pilot tones in the first subset, deriving a summed phase error estimate based on a phase error estimate of each of the demodulated plurality of pilot tones in the second subset relative to a reference signal;

controlling the converting of subsequent frames responsive to the summed phase error estimate; and for each of the first subset of the plurality of pilot tones, adjusting an associated reference signal, wherein the circuitry comprises:

a digital filter and processing function, for applying a digital filter and digital processing to the digital signal;

a demodulator function for demodulating the digital signal; and timing control circuitry for performing the selecting, deriving, controlling, and adjusting operations.

16. The apparatus of claim 15, wherein the circuitry further comprises:

a frequency domain equalizer, for processing the demodulated digital signal;

and wherein the timing control circuitry performs the adjusting operation by for each of the first subset of the plurality of pilot tones, adjusting the frequency domain equalizer in response to the demodulated digital signal for that pilot tone.

* * * * *